(12) United States Patent
Elenbaas et al.

(10) Patent No.: US 8,556,520 B2
(45) Date of Patent: Oct. 15, 2013

(54) SEALING ENCLOSURES FOR A CONNECTOR ON A CABLE, SUCH AS A STANDARDIZED FIBER-OPTIC CONNECTOR

(75) Inventors: Jacob Arie Elenbaas, Heyningen (NL); Jarno Verhoeven, Rosmalen (NL)

(73) Assignee: Tyco Electronics Nederland BV, S'Hertogenbosch (NL)

( * ) Notice: Subject to any disclaimer, the term of this patent is extended or adjusted under 35 U.S.C. 154(b) by 321 days.

(21) Appl. No.: 12/924,459

(22) Filed: Sep. 28, 2010

(65) Prior Publication Data

US 2011/0075971 A1 Mar. 31, 2011

(30) Foreign Application Priority Data

Sep. 28, 2009 (EP) ..................................... 09012270

(51) Int. Cl.
G02B 6/38 (2006.01)
G02B 6/36 (2006.01)

(52) U.S. Cl.
USPC .............................................. 385/55; 385/53

(58) Field of Classification Search
None
See application file for complete search history.

(56) References Cited

U.S. PATENT DOCUMENTS

| | | | |
|---|---|---|---|
| 4,846,714 A * | 7/1989 | Welsby et al. ................ | 439/348 |
| 5,271,080 A | 12/1993 | Hopper et al. | |
| 5,480,315 A | 1/1996 | Martinelli | |
| 5,670,747 A * | 9/1997 | Lawer et al. ................. | 174/74 R |
| 7,338,214 B1 * | 3/2008 | Gurreri et al. ................... | 385/55 |
| 2003/0063867 A1 * | 4/2003 | McDonald et al. ............. | 385/78 |
| 2004/0047566 A1 * | 3/2004 | McDonald et al. ............. | 385/78 |
| 2006/0035509 A1 * | 2/2006 | O'Connor ...................... | 439/369 |
| 2008/0026647 A1 * | 1/2008 | Boehnlein et al. ............ | 439/882 |
| 2010/0310213 A1 * | 12/2010 | Lewallen et al. ............... | 385/75 |

FOREIGN PATENT DOCUMENTS

| | | |
|---|---|---|
| DE | 35 14 010 C1 | 7/1986 |
| WO | WO 01/59501 A1 | 8/2001 |

OTHER PUBLICATIONS

European Extended Search Report issued by the European Patent Office, Rijswijk, Netherlands, dated Feb. 2, 2010, for related European Application No. 09012270.6; 6 pages.

* cited by examiner

*Primary Examiner* — Kaveh Kianni
(74) *Attorney, Agent, or Firm* — Faegre Baker Daniels LLP

(57) ABSTRACT

The invention relates to a sealing enclosure and a sealing assembly comprising the sealing enclosure and a mating enclosure as well as a method to connect both. The sealing enclosure loosely receives a connector within a connector volume so that the connector, which may be of a standard type used in electronic or optic data transmission, may be displaced within a plug face at the forward end of the connector volume. Thus, the connector may compensate variations in the position of a mating connector with respect to the mating enclosure. Moreover, the sealing enclosure allows to seal off the connector volume and engage the sealing enclosure with a mating enclosure in a single motion. This is affected by having a cable seal interposed between an inner body and an outer body. If the outer body is moved forward to engage the mating connector, the cable seal is squeezed between the cable and the inner body sealing off the connector volume at the rearward end of the inner body.

5 Claims, 4 Drawing Sheets

SEALING ENCLOSURES FOR A CONNECTOR ON A CABLE, SUCH AS A STANDARDIZED FIBER-OPTIC CONNECTOR

BACKGROUND OF INVENTION

The invention relates to a sealing enclosure for a connector on a cable, such as a standardized fiber-optic connector.

BRIEF SUMMARY OF INVENTION

According to the invention, one such sealing enclosure may include a cable seal adapted to sealingly engage the cable; an inner body comprising a connector volume adapted to receive the connector, the connector volume being open at least at a rearward end, and the cable seal is arranged at the rearward end of the connector volume; and an outer body adapted to slide over the inner body to a forward position, comprising at least one locking element that is adapted to axially secure the sealing enclosure to a mating enclosure if the outer body is in the forward position.

Another such sealing enclosure according to the invention may include a connector adapted to be mounted on an end of a cable, an inner body adapted to receive the cable and having a connector volume opening into a plug face at a forward end, and an outer body surrounding the inner body and being movable relative thereto.

Furthermore, the invention relates to a method for sealing a connection of a connector to an adaptor by a sealing assembly comprising a sealing enclosure and a mating enclosure, the method comprising the steps of sliding an outer body, a cable seal and an inner body of the sealing enclosure over a cable, mounting the connector on the cable, and coupling the inner body to the mating enclosure.

In the following, the direction "forward" is defined for the sealing enclosure as facing in the direction of the mating enclosure as seen from the sealing enclosure. The direction "rearward" designates the opposite direction, i.e. the direction facing away from the mating enclosure. For the mating enclosure, these directions are reversed: The "forward" direction for the mating enclosure points to the sealing enclosure and thus corresponds to the rearward direction of the sealing enclosure. Consequently, the "rearward" direction of the mating enclosure faces away from the sealing enclosure and corresponds to the forward direction of the mating enclosure.

The common forward-rearward direction of the sealing enclosure and the mating enclosure is also termed as axial direction.

From the prior art, the sealing enclosures of the type mentioned above are used as connector plugs or connector adaptors, as shown e.g. in U.S. Pat. No. 7,338,214 B1. As shown therein, the inner body may be configured as a plug body and the outer body as a shell which has a bayonet-style locking section. In the plug body and the mating enclosure, standardized connectors are fixedly mounted at a predetermined position within the enclosure.

The problem encountered with connectors of the type shown in U.S. Pat. No. 7,338,214 B1 is that they are cumbersome to be operated if not much space is available and especially if the mating connector to which the connector is to be coupled is situated on a circuit board. This is especially the case if the mating connector is part of a component such as an amplifier or transceiver.

Due to the number of parts, the connector of U.S. Pat. No. 7,338,214 B1 requires many steps for its assembly on site, often under time pressure and in limited space. This is prone to faults such as damage to the connectors or incomplete sealing.

The invention strives to solve these problems by providing a sealing enclosure that is both easy to be assembled and mounted on site and that at the same time reliably seals the connector from harsh environmental conditions.

This aim is achieved according to the invention for a sealing enclosure as mentioned above in that in the forward position, the outer body extends beyond the cable seal in the rearward direction and the cable seal is compressed by the outer body.

This solution effects that in a single motion the sealing enclosure may both be brought into engagement with the mating enclosure and the connector be sealed as the cable seal is compressed and thus tightened. In order to engage the locking element on the outer body, the operator has to move the outer body in the forward position by sliding it over the inner body. While moving the outer body into the forward position, the cable seal is automatically tightened and seals off the connector volume at a rearward end.

The above object is also solved for a sealing enclosure as mentioned above, in that the optical connector is received loosely in the forward opening and may be displaced in and/or perpendicular to the forward-rearward direction. This solution allows the connector to move freely with limited travel within the sealing enclosure. Thus, the connector may compensate variations in the position of the mating connector. The variable position of the connector within the forward opening, i.e. the plug face of the sealing enclosure, increases the freedom where the mating enclosure may be attached. This facilitates greatly the mounting of the mating enclosure in the field because close tolerances in the position of the mating connector do not need to be observed.

The sealing enclosure according to the invention is especially applicable for all types of standardized connectors in communication technology, especially for fiber-optic connectors such as LC-type connectors, or electronic connectors such as RJ-type connectors.

In comparison with the enclosure shown in U.S. Pat. No. 7,338,214 B1, the compression fitting which has to be mounted in a separate step is replaced by the cable seal which is automatically tightened in the forward position of the outer body. The connector is loosely received in the inner body and not fixed to an intermediate adaptor.

The above concept may be further improved if the following features are added. It is to be noted that the following features may be added individually and independently of each other.

In one improved further embodiment, for example, the outer body may be of a substantially hollow cylindrical shape, in which the inner body is received, which may also be of essentially cylindrical shape. Thus, an annular space is defined between the inner and the outer body if the outer body is in the forward position, which may also be of essentially cylindrical shape.

In the forward position, the outer body may, at the rearward end, extend beyond the inner body, so that the cable seal is securely held between the inner and the outer body.

According to another improvement, the sealing enclosure may further comprise a strain relief member that may be connected to the outer body. Further, the strain relief element may function as an additional seal and may sealingly abut the outer body. Alternatively, the cable seal may be sufficiently compressed in the forward position of the outer body to also work as a strain relief element or support the additional strain relief member. This is due to the compression of the cable seal, which is thereby pressed against the cable and—via friction—secures the sealing enclosure at its position on the cable via friction.

The at least one locking element serves to axially secure the sealing enclosure to the mating enclosure. The locking element may be of the bayonet-type in one preferred embodiment. The bayonet-type is advantageous, as it combines the forward motion, which leads to the sealing of the connector volume by the cable seal at the rearward end of the sealing enclosure, with a limited rotational locking motion for the axial lock. Due to the limited rotational motion, the torsion introduced into the cable seal is limited in the bayonet-style locking element. Of course, instead of the bayonet-type style, other locking elements may be used, such as a thread. A threaded connection however, may require several rotations in order to ensure a tight connection. This in turn may increase torsional strain on the cable seal compared to a bayonet coupling.

To facilitate and thus ensure the sealing of the connector volume at the rearward end, the inner body may be provided according to another preferred embodiment with a clamping section which may open in the rearward direction. Thus, the cable seal may be slid along the cable into the clamping section. The clamping section may have a retainer which is open in the rearward direction for receiving the cable seal. In the forward position of the outer body, the clamping section may be radially compressed onto the cable seal, which in turn is radially pressed onto the cable and thus seals of any gap between the cable and the cable seal. The clamping section may be radially elastic, e.g. by having radially deflectable, preferably elastic tongues which extend from the inner body along the cable in the rearward direction. The diameter spanned by these tongues is, in their neutral, non-displaced state, larger than the outer diameter of the cable seal, so that the cable seal may be received in the clamping section without using much pressure from the outer body.

The outer body may be provided at its rearward end with a closure section that may essentially comprise a wall section that faces the cable seal and is pressed against the cable seal or the clamping section if the outer body is in the forward position or is being moved into this position. In another embodiment, the outer body may not have any sealing function at all but only serves to lock the sealing enclosure with a mating enclosure. In this case, the sealing of the connector volume may be effected only by the inner body which is therefore provided with the necessary seals and sealing surfaces. However, to increase the tightness of the sealing enclosure not only the connector volume may be sealed, but also the space between the inner and the outer body.

The outer body may be provided with an engagement surface that is adapted to engage the clamping section and compress or deflect it radially around the cable seal if the outer body is in the forward position or moved into this position. The engagement surface may be a tapered or stepped cylindrical surface or wall, or a surface or wall of frusto-conical shape. At its forward end, the inner diameter of the engagement surface may be larger than the outer diameter of the clamping section. At its rearward end, the inner diameter of the engagement surface may be smaller than the outer diameter of the clamping section.

Particularly if the locking element is of the type that is rotated in order to be locked, it is preferred that the inner body is provided with at least one positive locking element that prevents a relative rotation between the inner body and the mating enclosure once the inner body and the mating enclosure are at least partly coupled. The positive locking element may be configured as a radially protruding rib extending along the cable direction away from the rearward end, or as a correspondingly formed groove or recess.

In a further improvement, the inner body may be provided at its forward end with a front seal; such as an O-ring, a circumferential and/or a forward-facing sealing surface. The front seal preferably surrounds the plug face in which the connector volume ends.

The connector volume may be of cylindrical or frusto-conical shape with the largest diameter located at the plug face. The diameter may taper towards the rearward end. At the rearward end, the diameter of the connector volume is preferably larger than the cable diameter, and at the plug face the diameter is preferably larger than the largest dimension of the connector in the radial dimension, i.e. perpendicular to the axial direction. The part of the connector volume that has a larger diameter than the connector may extend in one preferred embodiment for at least the connector length in the rearward direction from the plug face into the inner body. This allows for a loose reception of the complete connector within the connector volume, so that the connector may move at least in the direction perpendicular to the axial direction in the plug face.

The mating enclosure that is adapted to mate with the sealing enclosure in any one of its above-described configurations may comprise a preferably cylindrical guiding surface which is adapted to receive the plug section of the inner body. The inner contour of the mating enclosure may in particular correspond to the outer contour of at least the front part of the plug body, allowing for a snug fit with only small play. The guiding surface may also be provided with at least one positive locking element that is adapted to engage the at least one positive locking element of the sealing enclosure.

In order to provide adequate sealing, the mating enclosure may be provided with at least one sealing surface. One such sealing surface, preferably cylindrical in shape, may engage the circumferential surface of the inner body sealingly to affect a sealing of the radial gap between the inner body and the mating enclosure. Of course, the sealing may also take place on a forward facing surface of the inner body surrounding the plug face. In this case, the mating enclosure preferably provides a plane wall facing the plug face and a gasket may be interposed between the plug face and the mating enclosure. This sealing surface of the mating enclosure may be a part of the guiding surface.

The mating enclosure preferably comprises a central opening in which the connector and the cable are loosely received, so that in the coupled state, the position of the connector may vary both within the sealing enclosure and the mating enclosure. This may be achieved by dimensioning the central opening—like the connector volume—so that it is larger than the largest radial dimension of the connector.

Fastening elements, such as holes for the insertion of screws or clips may be provided on the mating enclosure so that it can be fixed on a component such as a circuit board or a transceiver and the like. The fastening elements may be arranged on a flange section of the mounting enclosure.

In the following, the invention is exemplarily explained with reference to an embodiment which combines the above-mentioned features. Of this combination, any feature may be omitted or added depending on whether the effect that is associated with this feature is desired or not.

BRIEF DESCRIPTION OF THE DRAWINGS

In the figures.

DETAILED DESCRIPTION OF THE INVENTION

First, the sealing enclosure according to the invention is described with reference to FIGS. 1 and 2.

Figure 1:
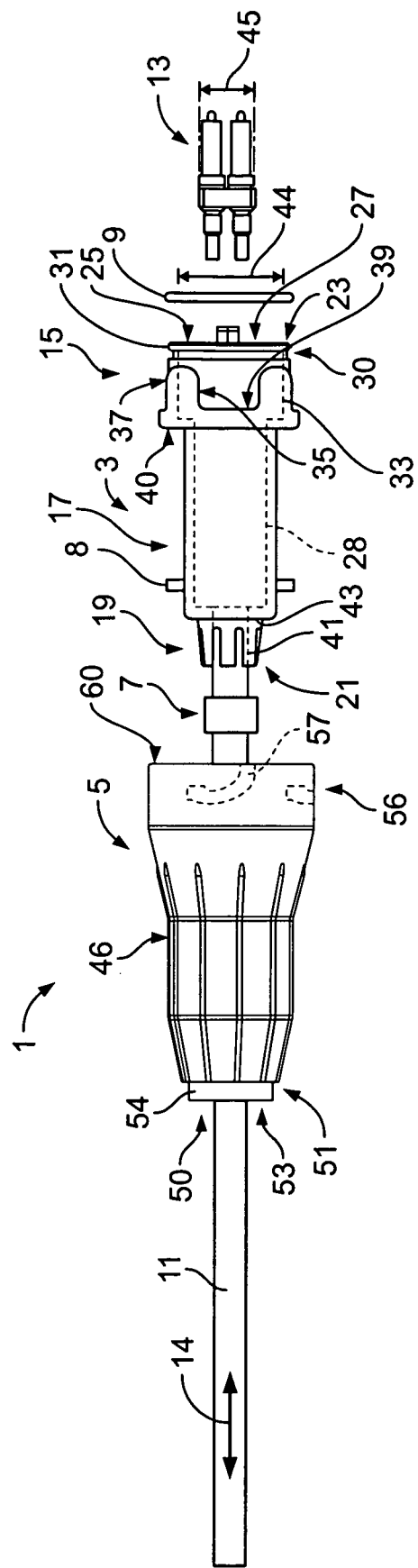
FIG. 1 shows a schematic rendition of a sealing enclosure according to the invention in an exploded side view.

In the embodiment of FIG. 1, a sealing enclosure 1 is shown that comprises an inner body 3, an outer body 5 and a cable seal 7 interposed between the inner body 3 and the outer body 5.

The cable seal 7 may consist of a single elastomeric ring with preferably rectangular cross-section in the circumferential direction. In addition to the cable seal 7, the sealing enclosure 1 may comprise other members such as an e.g. annular spring element 8 and an O-ring 9, that are also arranged between the inner body 3 and the outer body 5.

The outer body 5 may be moved relative to the inner body 3, preferably both slid along the inner body 3 and rotated with respect to the inner body 3. If the outer body 5 is slid over the inner body 3, there is a generally annular space 10 between the two. The annular space 10 extends parallel to a cable 11, which may be a fiber optic cable, over the entire length of the outer and inner body (see FIG. 2).

The sealing enclosure 1 is adapted to be mounted on a cable 11, such as a fiber-optic cable. The sealing enclosure 1 further is adapted to sealingly enclose a connector 13 which is mounted on an end 12 of the cable 11. The connector 13 may be of a standardized type used in communication technology, in particular, as shown, a dual LC-connector for the transmission of optical data signals.

The inner body 3 may be of essentially sleeve-like configuration. It represents a continuous outer wall mechanically shielding the connector volume in the radial direction, i.e. in any direction perpendicular to the cable 11. The inner body 3 may further be of generally elongated shape extending with its largest dimension along the cable 11 in an axial, forward-rearward direction 14. The inner body 3 is preferably of generally cylindrical shape and may comprise a plug section 15, a support section 17 and a clamping section 19 which all may have a generally cylindrical outer contour. The inner body 3 is adapted to be mounted on and slid along the cable 11.

The clamping section 19 is located at a rearward end 21, whereas the plug section 15 is located at a forward end 23 of the inner body 3. As a naming convention, all directions relating to the sealing enclosure and facing towards the end 12 of the cable 11 or, the mating enclosure or the connector 13, respectively, are termed the forward direction F (FIG. 2). All directions facing away from the end 12 of the cable 11, the mating enclosure or the connector 13 are termed rearward directions R (FIG. 2).

The plug section 15 encloses a forward facing plug face 25, which, in the present invention, is preferably completely open in the forward direction F and continues in the rearward direction R into the inner body 3 as a connector volume 27. The connector volume 27 constitutes the hollow interior of the inner body 3.

Figure 2:
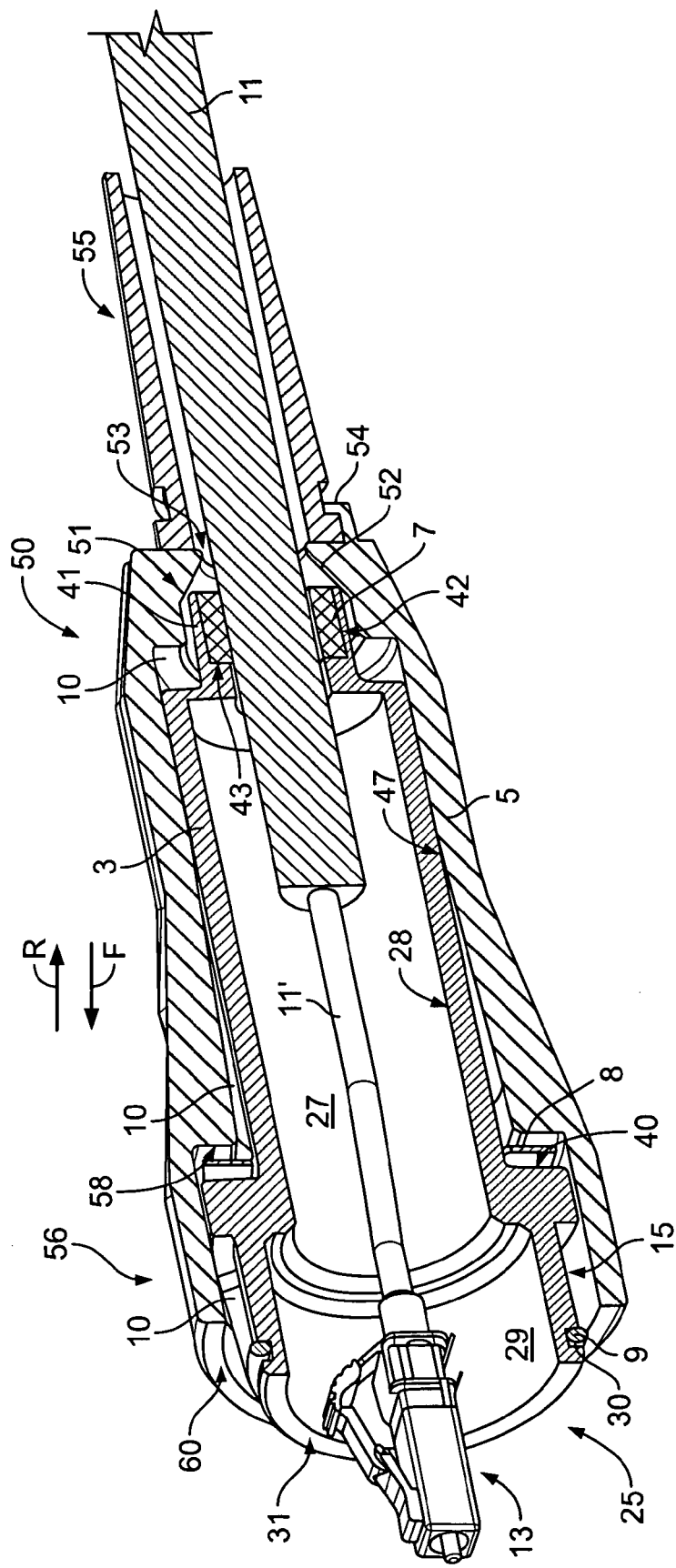
FIG. 2 shows the sealing enclosure of FIG. 1 in an assembled state in a schematic perspective and cross-sectional view.

The connector volume 27 may be of stepped cylindrical shape as shown in FIG. 2, having an inner wall 28. The connector volume 27 is dimensioned to loosely receive the connector 13 at least in a forward section 29. The forward section 29 extends over more than half, preferably over at least almost the complete axial length of the connector 13 in the axial direction. Thus, the connector 13 is received loosely, i.e. displaceable preferably both in the axial direction and in the plane of the plug face 25, in the connector volume 27. In the embodiment of FIG. 2, the forward section 29 is of a larger diameter than the rearward part of the connector volume 27 to provide more space for the connector 13. Alternatively, the connector volume 27 may also be of straight cylindrical, or of generally conical shape tapering in the rearward direction.

The plug section 15 is provided with at least one front sealing surface 29, which in the embodiment of FIG. 1, is established by the O-ring 9. The O-ring 9 may be inserted into a circumferential groove 30 close to the forward end 23. For additional or alternative sealing, an annular front wall section 31 enclosing the plug face 25 and facing in the forward direction F may also serve as a front sealing surface if pressed e.g. against a gasket of the mating connector (not shown).

The plug section 15 may comprise at least one positive locking element 33, which has preferably two opposing stop surfaces 35, 37 pointing in opposite circumferential directions about the cable 11 and the plug face 25. The at least one positive locking element 33 may be shaped as a protrusion protruding radially from the plug section 15 and extending in the forward-rearward direction 14, or as a groove open at its forward end, recessed radially in the plug section 15 and extending in the forward-rearward direction 14.

Furthermore, the plug section 15 may have a stop surface 39 facing in the forward direction. The stop surface 39 serves as a limitation to the depth over which the inner body may be inserted into the mating enclosure. At its rearward end, a rearward facing shoulder 40 serves as another stop surface that limits the insertion depth of the inner body 3 into the outer body 5.

As shown in FIG. 1, the plug section 15 may have an outer diameter different from, in particular larger than, the remaining sections of the inner body 3.

The support section 17 is of essentially smooth cylindrical shape. It may extend over more than half of the length of the inner body 3 along the cable 11, i.e. in the forward-rearward direction. It serves both a support and guidance surface for the outer body 5 and as a handle to facilitate installment and sliding of the inner body 3 on the cable 11. The outer diameter of the support section 17 may be larger than the outer diameter of the clamping section 19.

The clamping section 19 is configured to be deformed, particularly compressed, in the radial direction, i.e. perpendicular to the cable 11. In one embodiment, the clamping section 19 may include radially displaceable tongues 41 that may be spaced equidistantly about the perimeter of the rearward end 21 of the inner body 3, i.e. about the rearward opening in which the cable is received, and extend away from the rearward end essentially parallel to the forward-rearward direction, i.e. along the cable 11. The tongues 41 define a retainer 42 (FIG. 2) for receiving the cable seal 7 in the annular space between the tongues 41 and the cable 11. If the cable seal 7 is received in the retainer 42 at the clamping section 19, the tongues 41 are radially overlapping the outer surface of the cable seal 7 as shown in FIG. 2.

Depending on the specific way in which the cable seal 7 is inserted into the retainer 42, the inner diameter of the retainer 42 may be smaller or larger than the outer diameter of the uncompressed cable seal 7: If the cable seal 7 and the inner body 3 are preassembled, the inner diameter of the retainer 42 is preferably smaller than the outer diameter of the cable seal 7 so that the cable seal 7 is firmly held within the retainer by being radially compressed. In addition, the retainer 42 may engage behind the cable seal to prevent its slipping out if the inner body 3 and the cable seal 7 are slid together along the cable 11 in the forward direction F. Further, the inner diameter of the cable seal 7 received in the un-deformed clamping section 19 may be larger than the outer diameter of the cable 11 to facilitate the sliding along the cable 11.

If the cable seal 7 is inserted into the retainer 42 after both the cable seal 7 and the inner body have been mounted onto the cable 11, the inner diameter of the retainer 42 may be larger than the outer diameter of the cable seal 7 so that it may be easily pushed into the retainer 42 in the field. In this embodiment, the cable seal 7 may be used to temporarily fix the inner body on the cable 7, if it is pressed onto the cable 11 when received in the retainer 42.

The clamping section 19 is provided with a rearward facing wall 43, shown in FIG. 2. The wall 43 constitutes a sealing surface, against which the cable seal 7 may be pressed. In the wall 43 there is an opening for the cable 11, the diameter of the opening being smaller than the outer diameter of the cable seal 7. This opening connects to the connector volume 27. The wall 43 delimits the retainer 42 in the rearward direction R and represents a sealing surface against which the cable seal 7 abuts if the enclosure is coupled to the mating enclosure.

The inner diameter of the inner body 3 is dimensioned so that the cable 11 or a strand 11' of the cable 11 is received loosely and the inner body 3 may be slid along the cable. The connector volume 27 including the plug face 25 has, at least at its forward section 28, an inner width 44 that is larger than the largest radial dimension 45 of the connector 13 perpendicular to the forward-rearward direction. The connector 13 may thus be loosely received in the plug face 25 and the connector volume 27 at least in the region immediately behind the plug face 25.

The inner body 3 is received in the outer body 5, by sliding the latter over the former. The overall shape of outer body 5 may be the shape of a cylindrical or, as shown, frusto-conical hollow shell. The length of the outer body 5 in the forward-rearward direction 14 may be about the same as the length of the inner body 3. The rearward end 21 of the inner body 3 is covered completely by the outer body 5 if the sealing enclosure 1 is coupled or ready to be coupled to the mating enclosure. A gripping structure 46 comprising protrusions and/or recessions may facilitate the handling of the outer body 5.

The interior of the outer body 5 may comprise several sections of different diameter. The axial positions of these sections match the positions of the plug section 15, the support section 17 and the clamping section 19 in the state shown in FIG. 2, i.e. if the sealing enclosure 1 is ready to be coupled to the mating enclosure.

The support section 17 may, in one embodiment, act as a guiding surface, with the outer body 5 having a matching, smooth inner guiding surface 47, which is of slightly larger diameter than that of the support section 17. The inner surface 47 may widen slightly, preferably conically, in the forward direction F so that the inner body 3 is received self-centeringly without the danger of becoming wedged in the outer body 5.

At its rearward end 50, the interior of the outer body 5 is provided with a closure section 51, in which the clamping section 19 is received if the sealing enclosure 1 is coupled to the mating enclosure. The closure section 51 engages behind the cable seal 7 as seen from the connector 13. It is provided with an engagement surface shaped as a tapering inner wall 52. At its forward end the closure section has an inner diameter that is larger than the outer diameter of the clamping section 19. The inner diameter of the wall 52 at the rearward end of the closure section 51 is smaller than the outer diameter of the clamping section 19 or the tongues 41, respectively. If the outer body 5 is being slid over the inner body 3, the tapering wall 52 (FIG. 2) will gradually compress the tongues 41 and the cable seal 7 received therein in the radial direction. The wall 52 ends in the rearward direction R in an opening 53 through which the cable 11 may pass.

A support element 54 of a cage-like structure, into which a strain-relief 55 may be axially inserted, may be provided at the rearward end 50 of the outer body 5. The strain relief 55 is held in the support element by a positive lock. The strain relief 55 is secured axially by the support element 54. In FIG. 1, the strain relief 55 is not shown. At the rearward end 50, an opening for passing the cable 11 therethrough is also provided.

At the forward end 56 of the outer body 5, the interior of the outer body 5 forms an enlarged section compared to the surface 47 to accommodate the enlarged plug section 15 of the inner body. At least one locking element 57, e.g. of the bayonet type, or a thread preferably may be present at the forward end 56 of the outer body, preferably on the interior side facing the plug section 15.

The outer body 5 may be provided with an annular abutment surface 58 at the rearward end of the forward part 29. The abutment surface 58 faces the shoulder 40 of the inner body in the axial direction. If the sealing enclosure is coupled to the mating enclosure, the outer body assumes its forward position, in which the spring 8 may be compressed between the shoulder 40 and the abutment surface 58 to bias the inner body 3 away from the outer body 5 and to securely lock the bayonet connection between the two.

The outer body 5 may be further provided with a front sealing surface 60 which faces in the forward direction F and surrounds the inner body 3 at its forward end. The front sealing surface 60 may be used as an additional seal besides the O-ring 9 to seal off the connector volume 27 and the space 10.

Figure 3:
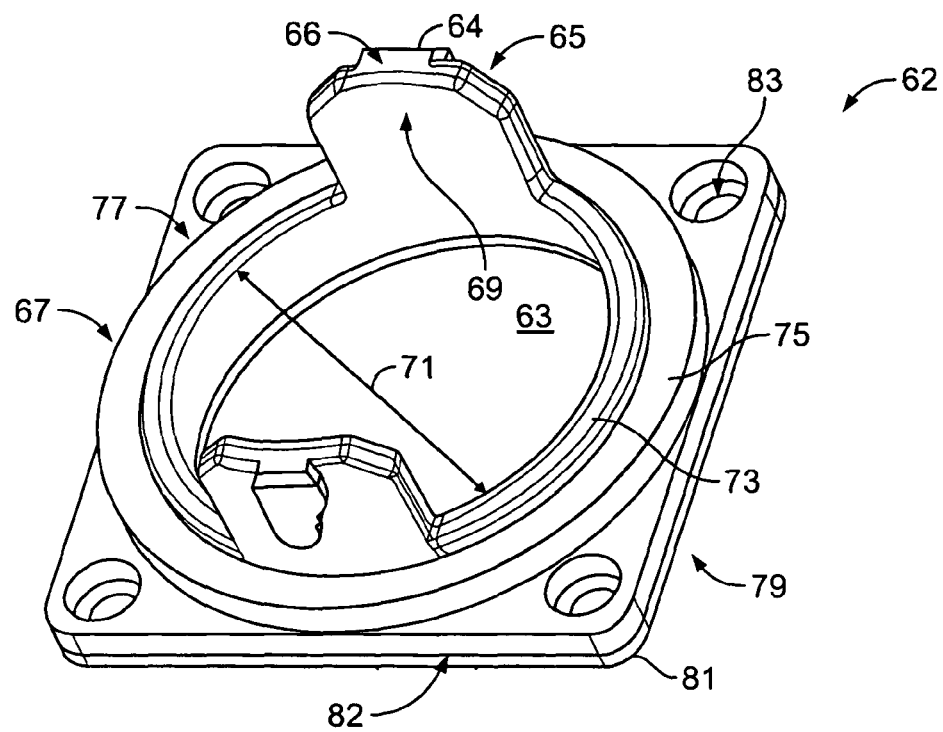
FIG. 3 shows a schematic rendition of a mating enclosure for the sealing enclosure of FIGS. 1 and 2 in a schematic perspective view.
Figure 4:
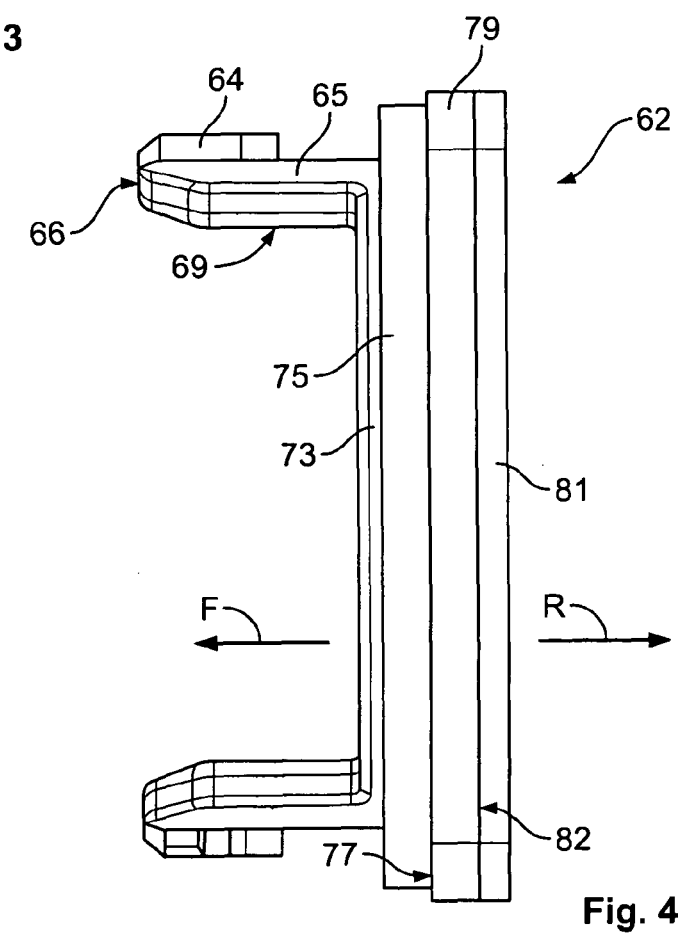
FIG. 4 shows the mating enclosure of FIG. 3 in a schematic side view.

Next, an embodiment of a mating section 62 is described exemplarily with reference to FIGS. 3 and 4.

The mating enclosure 62 has a central opening 63 of which the internal width in the radial direction is larger than the largest dimension of the connector 13 in the radial direction.

The mating enclosure 62 is further provided with at least one locking element 64 that matches the at least one locking element 57 of the outer body 5. In particular, as shown in FIG. 1, the at least one locking element 64 may comprise a protrusion 65, to enable a bayonet-type locking with the outer body 5.

As shown in FIG. 3, the locking element 64 may be positioned on two preferably inelastic tongues that protrude from a forward end of the mating enclosure 62 in the forward direction. Two or more of these locking elements may be provided if desired.

In the embodiment of FIG. 3, the protrusions 65 serve also as positive locking elements which engage between the positive locking elements 33 of the inner body 3 to prevent relative rotation between the inner body 3 and the mating enclosure 62. The forward end 67 of the protrusions 65 is designed to abut the stop surface 39 of the inner body 3.

The inner surface of the protrusions 65 is a part of a preferably continuous cylindrical inner surface 69 which continues in the forward-rearward or axial direction to enclose the central opening 63. The inner surface 69 constitutes both a guiding surface and a sealing surface for the inner body 3, in particular the sealing surface 29 or the O-ring 9, respectively. The inner diameter of the inner surface 69 is only slightly larger than the diameter at the forward end 23 of the inner body 3 to ensure a snug fit between the inner body 3 and the mating enclosure 62. The diameter 71 is, however, smaller than the outer diameter of the O-ring 9 so that the O-ring 9 is in sealing contact with the inner surface 69 if the inner body 3 is inserted into the mating enclosure 62.

The mating enclosure 62 has also a preferably annular collar 73 which is of smaller height in the axial direction than the protrusions 65. The collar 73 forms a support for a gasket 75 on its outer circumference. The gasket 75 is adapted to abut against the front sealing surface 60 of the outer body 5 once the sealing enclosure 1 and the mating enclosure 62 are fully coupled.

The forward face 77 of the mating enclosure 62 is formed by a flange 79 which is provided at its rearward face with a gasket 81. Holes 83 may be provided to receive fastening elements.

The gasket 81 is adapted to be sealingly pressed against a component such as a circuit board or an electric or optical amplifier, transceiver or the like, so that no contaminations may reach the connector volume 27 via the rearward face 82 of the mating enclosure 62. The sealing engagement between the O-ring 9 and the inner surface 69 prevents also contaminations such as dirt and moisture from entering the connector volume 27 through the plug face. The optional engagement between the sealing surface 60 and the gasket 75 seals off the space 10 between the inner body 3 and the outer body 5 and of course present another barrier for dirt and moisture against entering the connector volume 27.

Thus, the connection between the connector 13 and its matching adaptor (not shown) may be completely sealed off with the sealing enclosure 1 and the mating enclosure 62 in their coupled state according to the invention. The size of the connector volume 27 and the central opening 63 in the radial direction ensures that the connector 13 is received loosely. The movability of the connector 13 within the sealing enclosure 1 and the mating enclosure 62 allows compensating variations in the position of the matching adaptor within the central opening 63. Thus, the mating enclosure 62 may be placed at a position where the sealing by the gasket 81 is most effective without regard to the position of the adapter matching the connector 13.

The sealing of the connector volume 27 and preferably also of the space 10 between the inner body 3 and the outer body 5 is effected at the rearward end in a single motion during the coupling of the sealing enclosure 1 and the meting enclosure 62. This is explained in the following.

On site, an operator shortens the cable 11 to the appropriate length that is needed for the desired connection to a component e.g. an SFP transceiver on a printed circuit board having a dual LC-adaptor. Of course, any other component may be used as well.

Before or after shortening the cable 7, the operator first slides the outer body 5 onto the cable with rearward end 50 of the outer body 5 facing away from the cable end 12. After this, the operator mounts the cable seal 7 and then, the inner body 3 with the forward end 23 facing to the cable end 12.

The cable seal 7 may, however, also be pre-assembled with the inner body 3 and be mounted and slid along the cable together with the inner body. The O-ring 9 may also already be pre-assembled on the inner body 3 or may be mounted on site. Finally, the operator mounts the connector 13 onto the end of the cable 11. Now, the sealing enclosure 1 is mounted in the configuration shown in FIG. 1.

If, starting from the position shown in FIG. 1, the sealing enclosure 1 is to be coupled to a mating enclosure 62 (FIG. 3), first, the connector 13 is mated to a corresponding adaptor (not shown). Then, the inner body 3 is slid forward on the cable 11 until engagement with the mating enclosure 62. The stop surface 39 prevents that the inner body 3 is inserted too deeply into the mating enclosure. In the shown embodiment, this engagement leads also to a positive lock between the inner body 3 and the mating enclosure 62. The positive lock prevents rotation of the inner body 3 with respect to the mating enclosure 62.

Next, the outer body 5 is slid forward on the cable 11 over the inner body 3 into its forward position in order to bring the locking element 57 of the outer body 5 into engagement with a matching locking element on the mating enclosure 62.

If the cable seal is not yet received in the retainer 42, the outer body 5 in one embodiment may automatically push the cable seal 7 along the cable 11 in the forward direction F into the retainer 42.

Preferably, the outer body 5 is guided in the forward-rearward direction, i.e. along the cable 11, by the support section 17 to further facilitate the coupling process. Near the end of the forward motion of the outer body 5, the clamping section 19 is compressed around the cable seal 7 by the tapering wall 52. The radial compression leads to a tight fit of the cable seal 7 on the cable 11 and to a lengthening of the cable seal 7 in the axial direction so that the cable seal 7 presses against wall 43. Thus the rearward end of the connector volume is sealed off. If the axial length of the cable seal is chosen so that it projects in the rearward direction from the clamping section, the space 10 may also be sealed by the tapering wall 52 pressing directly against cable seal 7.

During the forward motion, the locking elements of the outer body are brought into engagement with the locking elements of the mating enclosure 62. At the end of the forward motion of the outer body 5 relative to the inner body 3 and the mating enclosure 62, the outer body is rotated with respect to the inner body 3 which is locked non-rotationally to the mating enclosure 62 due to the locking elements 35, 37, 65. This leads to a full engagement of the locking elements and a completion of the connection. At the same time the spring element 8 is compressed axially between the outer and the inner bodies 3, 5. The compression of the spring element 8 may be released somewhat at the end of the rotation by allowing the outer body 5 to move away from the mating enclosure 62 at the end of the rotation and snap into a recess. Thus, the outer body 5 and the mating enclosure 62 are locked non-rotationally at this position. Release of the locking engagement may only be affected after the outer body 5 is moved towards the mating enclosure 62 against the action of the spring 8.

At the forward position, the O-ring 9 is in sealing engagement with the inner surface 69, and the front surface 60 is pressed into the gasket 75.

Figure 5:
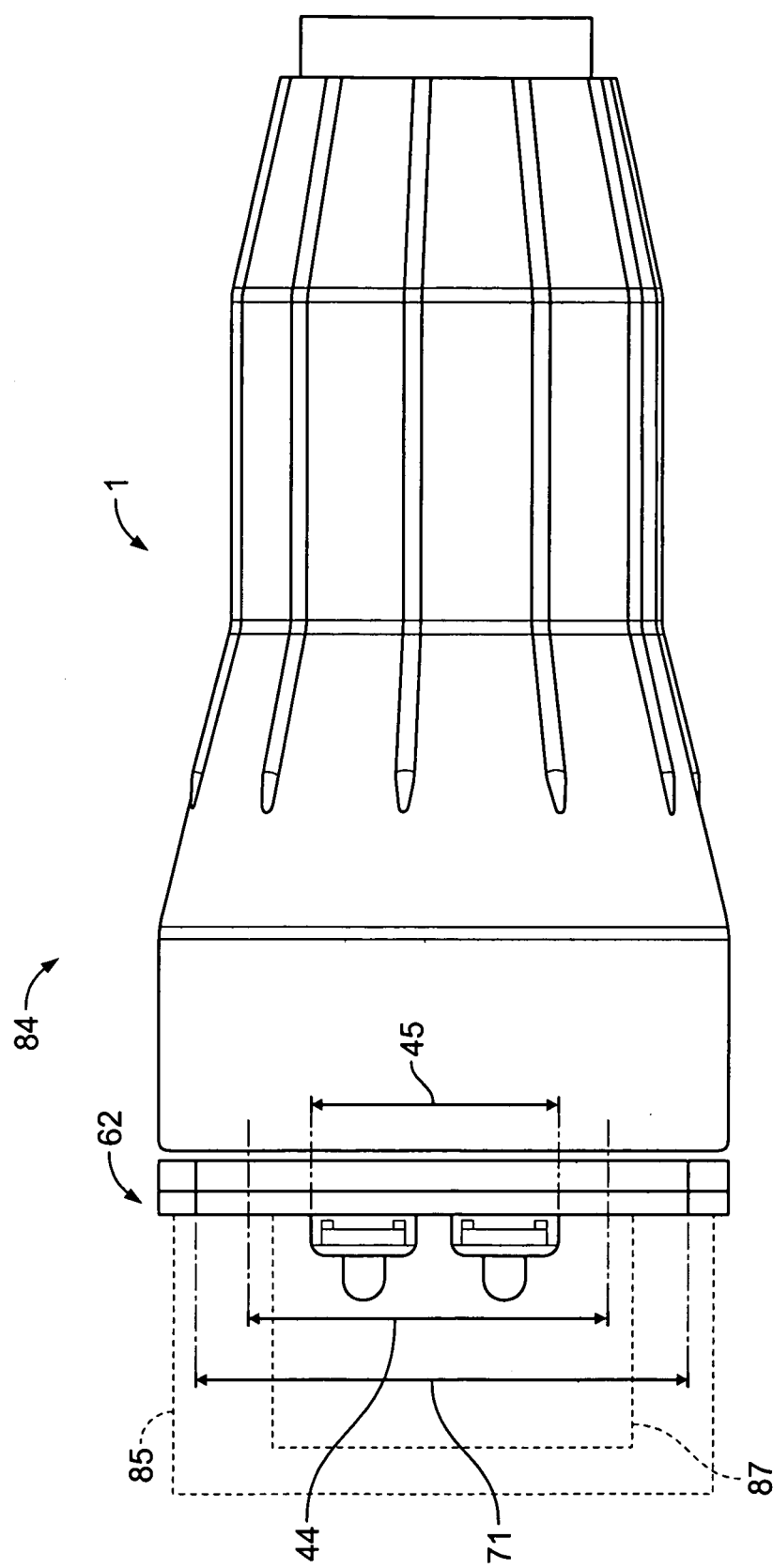
FIG. 5 shows the sealing assembly comprising the sealing enclosure of FIGS. 1, 2 and the mating enclosure of FIGS. 3, 4 in the plug state in a schematic side view.

FIG. 5 shows a sealing assembly 84 comprising sealing enclosure 1 and the mating enclosure 62 in the coupled state, i.e. the outer body 5 in the forward position, without strain relief. The mating enclosure 62 is mounted on a component 85 that is shown schematically using phantom lines. As can be seen, the inner widths 44, 71 of the connector volume 27 and of the central opening 63 are larger than the largest radial dimension 45 of the connector 13 so that the connector 13 may be moved within the mounted sealing enclosure 1 and mating enclosure 63 to adapt to the actual position of an adaptor 87 within the mating enclosure 62. The overall configuration of the sealing enclosure 1 allows for an easy singlehanded mounting operation. The sealing and the locking of the sealing enclosure 1 and the mating enclosure 62 is affected in a single motion.

The invention claimed is:

1. A sealing enclosure for a connector on a cable, the sealing enclosure comprising:
    a cable seal adapted to sealingly engage the cable;
    an inner body comprising a connector volume adapted to receive the connector, the connector volume being open at least at a rearward end and the cable seal being arranged at the rearward end of the connector volume, the inner body at its rearward end being provided with a clamping section, which is adapted to receive the cable seal and which is adapted to be compressed radially about the cable seal; and
    an outer body adapted to slide over the inner body to a forward position, comprising at least one locking element that is adapted to axially secure the sealing enclosure to a mating enclosure when the outer body is in the forward position, the outer body being provided with a wall tapering in the rearward direction, the wall compressing the clamping section around the cable seal;
    wherein in the forward position, the outer body extends beyond the cable seal in the rearward direction and the cable seal is compressed by the outer body.

2. The sealing enclosure according to claim 1, wherein the sealing enclosure comprises the connector mounted on an end of the cable, the connector being received loosely at least in a forward section of the connector volume.

3. The sealing enclosure according to claim 1, wherein the connector is received displaceable relative to the inner body in a direction perpendicular to the forward-rearward direction.

4. The sealing enclosure according to claim 1, wherein the connector is received displaceable relative to the inner body in the forward-rearward direction.

5. The sealing enclosure according to claim 1, wherein a space extending between the inner body and the outer body is sealed at a rearward end of the outer body by the cable seal in the forward position of the outer body.

* * * * *